Dec. 26, 1933.   M. P. H. L. RAEPSAET   1,941,053
PROCESS OF MANUFACTURING BALLS AND SMALL ARTICLES
OF CLOSED CELL CELLULAR RUBBER
Filed Aug. 24, 1931

Inventor:
M. P. H. L. Raepsaet,
by E. F. Wenderoth
Atty

Patented Dec. 26, 1933

1,941,053

UNITED STATES PATENT OFFICE 1,941,053

PROCESS OF MANUFACTURING BALLS AND SMALL ARTICLES OF CLOSED-CELL CELLULAR RUBBER

Maurice Paul Henri Léon Raepsaet, Aurec-sur-Loire (Haute Loire), France, assignor to Societe Belge du Caoutchouc Mousse, Berchem-Ste.-Agathe lez Brussells, Belgium, a corporation of Belgium Application August 24, 1931, Serial No. 559,102, and in Germany July 20, 1931

4 Claims. (Cl. 18—53)

It is known that the essential operation in the manufacture of cellular rubber with closed cells, that is to say, consisting of a mass of rubber containing a very large number of minute separate internal cells, filled with gas, is the vulcanization of the mass of rubber contained in a mould, which is not gastight and is placed in an autoclave charged with a gaseous atmosphere under very high pressure. When the mass of rubber is somewhat thick, the gas does not penetrate as far as the core, and the vulcanization is not uniform, nor is the mass homogeneous.

The chief object of the invention now to be described is to facilitate said penetration by the gas, and is characterized in that the rough-moulded article of raw rubber is provided with a certain number of channels, preferably radial, and fitted, if necessary, with devices intended to prevent them from closing up during the aforesaid vulcanization.

On issuing from the vulcanizing mould, the balls expand considerably and exhibit protuberances due to the irregular distribution of the gases in the peripheral layer, where the mass of rubber is not perfectly homogeneous, some portions of said layer yielding more readily than the others.

These protuberances are more frequent and extensive when the mass has been provided with the aforesaid channels, and cause them to assume the form of craters at the surface.

Moreover, a rough skin is formed on the surface of the ball, owing to rupture of the superficial cells. According to a second feature of the invention, these imperfections are removed by grinding the surface of the ball before placing it in the expansion mould for the second baking.

Two typical methods of piercing the balls are hereinafter described, and are illustrated in the accompanying drawing.

Figure 1:
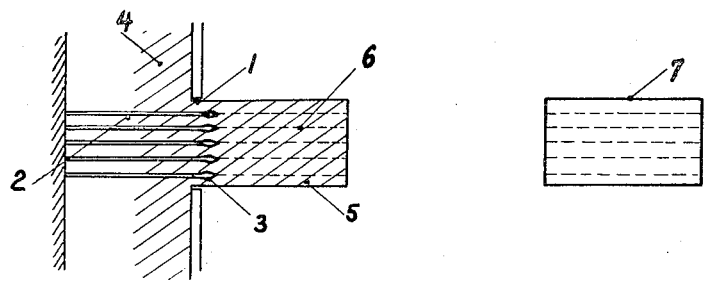
Figure 2:
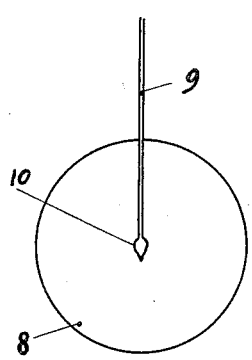
Figure 3:
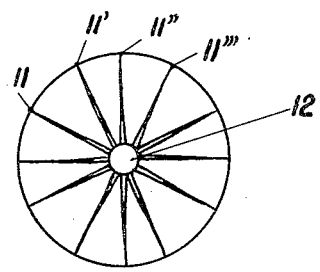
Figure 4:
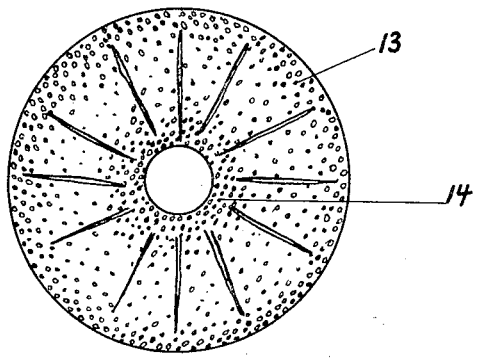

Figure 1 represents a plodder with capillary needles and Figure 2 a ball with needle in the position of piercing. Figures 3 and 4 shew a diametrical section of the pierced rough and finished ball respectively.

According to Figure 1, the discharge opening 1 of the "plodder" is provided with a certain number of capillary needles 2, with enlarged points 3. The mass of hot, pasty rubber 4, impelled by the worm conveyor (not shewn) of the plodder, forms, at the outlet, a roll 5, in which the passage of the needles 2 has left channels 5, which remain open to a sufficient extent. The roll is cut up into portions 7 of the desired weight to form a ball, and the portion 7 is placed in a ball-shaping mould, consisting of two hemispherical cavities, in order to shape it into a spherical blank. The channel 6, which still exist in the blank, enable the high-pressure gases to penetrate into the core of the mass during the vulcanizing in the autoclave.

In another process (Figs. 2—4), the blank 8 of raw rubber is pierced with a large number of radial channels by means of a needle 9, with enlarged point 10, which is forced in almost to, or beyond the centre, or even from one side to the other. If the blank be cut through diametrically after piercing in this manner, it will be seen (Fig. 2) that the repeated passing of the needle through the centre, along the radial channels 11, 11', 11", etc., has formed a central cavity 12. In the autoclave, the high-pressure gas penetrating through all the channel fills the chamber 12 and penetrates throughout the entire mass during vulcanization. A diametrical section of the ball, on leaving the autoclave and after expanding (Fig. 4) shews that the entire mass has acquired a more uniform cellular texture than if the pierced channels were absent. The cells are slightly larger in the peripheral and central regions 13 and 14, and traces of the channels 11, 11' etc., are still discernible. The existence of the central cavity makes the ball bounce better and reduces the weight per given volume.

In the event of the channels formed by the needle or needles not remaining sufficiently open to allow the high-pressure gases in the autoclave to penetrate freely, talc is injected, or a woolen thread—preferably untwisted, and dusted with talc—is left in the channels.

After the ball has freely expanded, on being taken out of the mould which enclosed it in the autoclave, this ball has an irregular and rugged surface, covered with a skin formed by contact with the mould and by the other layer of rubber, in which the cells have burst, the position of the pierced channels being indicated by craters. If such a ball be heated in the expansion mould, creases might form on its surface. According to the invention, the ball is ground, to remove the skin and protuberances and approximately restore its spherical shape. It is then heated in an expansion mould, where it acquires a highly uniform shape and surface.

What I claim is:—

1. The process of manufacturing cellular rubber balls and other articles having closed cells containing gas under pressure consisting in drilling passages through the body of the crude blanks by means of needles, placing the blanks in molds, introducing the molds in an autoclave filled with gas under high pressure, heating the blanks contained in the molds and thus partially vulcanizing them, taking the blanks out of the molds, grinding them until their surface is made smooth, placing the blanks in a second series of molds and again heating them until vulcanization is complete.

2. The process of manufacturing cellular rubber balls and other articles having closed cells containing gas under pressure consisting in discharging the crude rubber in form of cylinders from a press whose outlet is provided with longitudinal needles, shaping the crude rubber into blanks of the desired form, drilling passages through the body of the blanks by means of needles, placing the blanks in molds, introducing the molds in an autoclave filled with gas under high pressure, heating the blanks contained in the molds and thus partially vulcanizing them, taking the blanks out of the moulds, grinding them until their surface is made smooth, placing the blanks in a second series of moulds and again heating them until vulcanization is complete.

3. The process of manufacturing cellular rubber balls with closed cells containing gas under pressure consisting in drilling passages through the body of the crude blanks up to, on slightly beyond the centre by means of needles, placing the blanks in moulds, introducing the moulds in an autoclave filled with gas under high pressure, heating the blanks contained in the moulds and thus partially vulcanizing them, taking the blanks out of the moulds, grinding them until their surface is made smooth, placing the blanks in a second series of moulds and again heating them until vulcanization is complete.

4. The process of manufacturing cellular rubber balls and other articles having closed cells containing gas under pressure consisting in drilling passages through the body of the crude blanks by means of needles and introducing into these passages a strand of wool which is not twisted and which is impregnated with talc, placing the blanks in moulds, introducing the moulds in an autoclave filled with gas under high pressure, heating the blanks contained in the moulds and thus partially vulcanizing them, taking the blanks out of the moulds, grinding them until their surface is made smooth, placing the blanks in a second series of moulds and again heating them until vulcanization is complete.

MAURICE PAUL HENRI LÉON RAEPSAET.